United States Patent [19]

Sharma et al.

[11] Patent Number: 5,594,061
[45] Date of Patent: Jan. 14, 1997

[54] AQUEOUS COATING FOR VINYL CHLORIDE POLYMER SUBSTRATE

[75] Inventors: Satish C. Sharma, Stow; John P. Kovalchin, Akron; Raymond J. Weinert, Garfield Heights, all of Ohio

[73] Assignee: GenCorp Inc., Fairlawn, Ohio

[21] Appl. No.: 212,619

[22] Filed: Mar. 11, 1994

Related U.S. Application Data

[63] Continuation-in-part of Ser. No. 944,585, Sep. 14, 1992, abandoned.

[51] Int. Cl.$^6$ ................................................ C08L 33/14
[52] U.S. Cl. .................. 524/503; 524/506; 524/509; 524/510; 524/731; 524/588; 524/269; 524/155; 524/864; 525/57; 525/58; 525/61; 525/162
[58] Field of Search ............................ 525/162, 57, 58, 525/61; 523/213, 212; 524/442, 493, 731, 864, 588, 503, 506, 509, 510, 269, 155

[56] References Cited

U.S. PATENT DOCUMENTS

| | | | |
|---|---|---|---|
| 3,318,971 | 5/1967 | Chloupek et al. | 525/162 |
| 3,328,339 | 6/1967 | Tierney | 523/213 |
| 3,361,696 | 1/1968 | Bolgiano et al. | 524/824 |
| 3,598,770 | 8/1971 | Moore et al. | 525/162 |
| 3,901,840 | 8/1975 | Irvin et al. | 524/512 |
| 3,926,888 | 12/1975 | Cheung et al. | 524/512 |
| 3,928,273 | 12/1975 | Chang et al. | 524/512 |
| 3,996,177 | 12/1976 | Ludwig | 524/512 |
| 4,139,514 | 2/1979 | Bassett | 524/824 |
| 4,169,088 | 9/1979 | Hansen | 427/140 |
| 4,276,212 | 6/1981 | Khanna et al. | 524/512 |
| 4,461,858 | 7/1984 | Adelman | 524/49 |
| 4,476,286 | 10/1984 | Das et al. | 525/162 |
| 4,524,173 | 6/1985 | Rehfuss et al. | 524/512 |
| 4,603,074 | 7/1986 | Pate et al. | 428/172 |
| 4,710,543 | 12/1987 | Chattha et al. | 525/161 |
| 4,716,200 | 12/1987 | Berghoff | 525/111 |
| 4,757,106 | 7/1988 | Mayer et al. | 524/262 |
| 4,767,816 | 8/1988 | Iacoviello et al. | 524/459 |
| 4,794,136 | 12/1988 | Touhsaent | 524/512 |
| 4,920,176 | 4/1990 | Jorgensen, Jr. | 525/185 |
| 5,302,671 | 4/1994 | Cifuentes et al. | 525/477 |

FOREIGN PATENT DOCUMENTS

| | | | |
|---|---|---|---|
| 056086 | 11/1991 | Japan | 523/213 |
| 1509791 | 4/1978 | United Kingdom . | |

*Primary Examiner*—Mark Warzel
*Attorney, Agent, or Firm*—Robert F. Rywalski; Samuel B. Laferty

[57] ABSTRACT

A water based coating composition provides a stain resistant layer which adheres well to a substrate and is resistant to chemical attack by common household cleaning solvents such as isopropyl alcohol. The coating composition has a very low volatile organic compound content, thus providing an environmentally desirable alternative to organic solvent based coatings. The low volatile organic compound content of the composition substantially or completely eliminates the problems and expenses associated with solvent recovery for meeting chemical emission standards, and the potential for human exposure to solvent vapor is substantially eliminated or significantly reduced. The coating composition is aqueous based and incorporates a crosslinkable acrylic polymer latex, an amino resin crosslinking agent and a crosslinking catalyst. The polymer, crosslinking agent and catalyst are dispersed and/or solubilized in an aqueous medium. The coating composition is particularly well suited for application to flexible vinyl chloride polymer substrates to produce upon curing and drying a stain resistant, easily cleanable laminate. The stain resistant laminates can be advantageously used in the manufacture of wallcoverings, luggage exteriors, upholstery, vehicle interior and seat coverings, golf bags and other sporting goods, table cloths, and other similar applications.

9 Claims, No Drawings

5,594,061

AQUEOUS COATING FOR VINYL CHLORIDE POLYMER SUBSTRATE

CROSS REFERENCE

This is a continuation-in-part of prior application Ser. No. 07/944,585, filed Sep. 14, 1992, now abandoned.

FIELD OF INVENTION

The invention relates to an aqueous crosslinkable acrylic polymer coating composition which has a very low volatile organic compound content, and which upon application to a substrate and subsequent drying and curing forms a protective, stain resistant layer of a laminate. The invention further relates to a vinyl chloride polymer laminate having a stain, solvent and abrasion resistant, protective layer formed from the aqueous coating composition, and to a process for making the same.

BACKGROUND

Flexible vinyl chloride polymer sheet materials are commonly used in a wide variety of decorative applications including wallcoverings, upholstery and decorative films. It is generally desirable that the exposed surface of the vinyl chloride polymer sheets be provided with a protective, stain-resistant layer which can be easily cleaned without excessive rubbing or excessive use of harsh cleaning solvents. The protective layer should preferably exhibit good abrasion and solvent resistance. The aqueous coating composition should have a long shelf-life and good colloidal stability. For applications wherein a low gloss coating is desired for aesthetic reasons, such as for upholstery, it is highly desirable that flatting agents such as silica are capable of being effectively dispersed or redispersed in the coating composition.

A compounded and plasticized vinyl chloride polymer laminate having an outer adherent and stain resistant layer comprising the crosslinked reaction product of a reactive polyester having free carboxylic acid groups and an alkylated benzoguanamine-, urea- or melamine-formaldehyde resin is disclosed in U.S. Pat. No. 4,603,074.

One shortcoming with the stain resistant layer disclosed by U.S. Pat. No. 4,603,074 is that it is produced by coating a vinyl chloride polymer substrate with a solvent based curable polyester resin system having a high volatile organic compound content (typically 50 percent or more). The volatile organic components of the solvent which are evaporated during drying and curing of the coating must be recovered in order to comply with government regulations relating to chemical emission standards. Because of the problems and expense of solvent recovery and the potential for inadvertent human exposure to solvent vapor, it is highly desirable to provide a curable coating composition having a low volatile organic compound content which upon application to a vinyl chloride polymer substrate and subsequent curing forms an adherent, stain resistant layer of a laminate.

Another disadvantage with the stain resistant layer disclosed by U.S. Pat. No. 4,603,074 is that the ball point and felt tip pen stains cannot be easily removed with ordinary soaps or detergents, but instead often require harsher solvents such as acetone. It is desirable to provide a coating capable of forming a stain resistant layer on a vinyl chloride polymer substrate wherein the removal of frequently encountered stains can be effected without resorting to acetone or other harsh solvents.

U.S. Pat. Nos. 3,996,177 to Ludwig, 4,524,173 to Rehfuss et al., and 4,794,136 to Touhsaent each teach crosslinkable acrylic latex compositions.

Ludwig discloses a latex coating composition for providing hardboard with a hard, water resistant, and chemical resistant coating. The reference teaches that a combination of melamine-formaldehyde and urea-formaldehyde crosslinking agents are needed to achieve good shelf stability and good water resistance. Ludwig is unconcerned with substantially eliminating volatile organic compounds and consistently teaches the addition of substantial amounts of isopropyl alcohol to the disclosed latex coating compositions. Ludwig is also unconcerned with providing polyvinyl chloride substrates with low gloss coatings.

Rehfuss et al. disclose coating compositions for rigid metal or plastic substrates which simultaneously exhibit improved hardness and impact resistance. Rehfuss et al. utilize predominantly nonionic surfactants to allow the use of substantial amounts of acid catalysts to bring the pH of the composition down to the range of 1.0–02. It is disclosed that the low pH is required for rapid, low temperature curing, but makes the composition disadvantageous for use with a full range of substrates, and is therefore preferably used as a topcoat of a two-coat system. Rehfuss et al. teach that the latex polymer must contain from about 4 to about 9 percent by weight of an amide functional monomer to provide stability with the nonionic surfactants which are used. Rehfuss et al. are also unconcerned with providing a low gloss coating for polyvinyl chloride substrates.

Touhsaent teaches an adhesive composition for bonding a polyolefin film to a polyvinylidene chloride film and is completely unconcerned with providing a low gloss topcoat for polyvinyl chloride substrates. Touhsaent specifically teaches the use of chain transfer agents during preparation of the latex polymer which leads to lower molecular weight acrylic polymers which are generally unsuitable as coatings for polyvinyl chloride substrates because of their poor chemical and solvent resistance.

SUMMARY OF THE INVENTION

In accordance with the present invention, a substrate is coated with a water based composition having a low volatile organic compound content and comprising a crosslinkable acrylic polymer aqueous latex and an amino resin, preferably a partially or fully alkylated amino resin, crosslinking agent, and then heated at a suitable temperature for a period of time sufficient to cure and dry the coating to form a stain resistant layer of a laminate structure. The coatings of the invention generally contain no or only incidental amounts of volatile organic compounds such as less than about 1 percent by weight. The stain resistant layer has good adhesion to, for example, a vinyl chloride polymer substrate, and good resistance to chemical attack by solvents such as isopropyl alcohol. The coating compositions can be used without flatting agents to achieve a high gloss finish. However, conventional flatting agents such as wax and silica are usually compounded with the coating composition to reduce gloss when a flat finish is desired. Low gloss finishes are usually preferred for aesthetic reasons, particularly for vinyl chloride wallcoverings and upholstery. It is well known that flatting agents generally reduce the stain cleanability of cured coatings which form a protective layer of a laminate. The coatings of the present invention provide good cleanability without the use of harsh solvents even when high amounts of flatting agents are present in the coating.

The compositions of the invention exhibit excellent stability with or without the use of urea-formaldehyde crosslinking agents, and with or without flatting agents.

In accordance with a preferred aspect of the invention, polyvinyl alcohol is added to the coating compositions of the invention to further improve shelf-stability, especially when a more reactive (i.e. partially alkylated) melamine-formaldehyde resin is used. The polyvinyl alcohol also unexpectedly reduces the gloss of the coating, and is believed to improve chemical (i.e. solvent) resistance, thereby improving stain cleanability.

In accordance with a further preferred aspect of the invention, it has been discovered that certain surfactants based on dialkyl esters of sulfosuccinic acid provide unexpected improvements in scrub resistance when used in the coating compositions.

A still further aspect of the invention which has been found to provide unexpected benefits relating to improved flatting agent dispersibility and redispersibility involves the use of polydimethysiloxanes.

In order to achieve higher molecular weight latex polymers, the latex compositions of the invention are preferably prepared without chain transfer agents. Compositions of the invention which are prepared without chain transfer agents have been found to exhibit better scrub resistance.

The coating compositions of the invention are preferably used with a vinyl chloride polymer substrate, but can be advantageously employed with other substrates, especially polymeric substrates such as nylon, polyester, cellulosic and acrylic substrates.

DESCRIPTION OF THE PREFERRED EMBODIMENT

In accordance with a preferred embodiment of the invention, a vinyl chloride polymer is used to form the substrate to which a coating composition of the invention is applied and cured to form a laminate having a protective stain resistant layer. The vinyl chloride polymer can generally be any of the commercially available vinyl chloride polymers produced by the well known methods of suspension, bulk, emulsion, or solution polymerization. The vinyl chloride polymer is preferably a homopolyvinyl chloride, but a copolymer comprising a major amount by weight of vinyl chloride and a minor amount by weight of a copolymerizable monomer such as vinyl acetate, vinylidene chloride, maleic ester, and mixtures thereof can be used. Mixtures or blends of vinyl chloride polymers can also be used.

The coating composition of the invention is preferably used in association with vinyl chloride polymers which are compounded with conventional plasticizers. The amount of plasticizer used to plasticize the vinyl chloride polymer to make it flexible may vary such as from about 30 to about 100 parts by weight per 100 parts by weight of total vinyl chloride polymer resin. Examples of plasticizers which may be used are butyl octyl phthalate, dioctyl phthalate, hexyl decyl phthalate, dihexyl phthalate, diisooctyl phthalate, dicapryl phthalate, di-n-hexyl azelate, diisononyl phthalate, dioctyl adipate, dioctyl sebacate, trioctyl trimellitate, triisooctyl trimellitate, triisononyl trimellitate, isodecyl diphenyl phosphate, tricresyl phosphate, cresyl diphenyl phosphate, polymeric plasticizers such as adipic acid polyester, azelaic acid polyester and sebacic acid polyester, epoxidized soybean oil, octyl epoxy tallate, isooctyl epoxy tallate, and mixtures thereof.

Other compounding ingredients are desirably incorporated in the vinyl chloride polymer compositions. Examples of such ingredients are the silicas such as precipitated silica, fumed colloidal silica, calcium silicate and the like, calcium carbonate, ultra violet light absorbers, fungicides, carbon black, barytes, barium-cadmium-zinc stabilizers, barium-cadmium stabilizers, tin stabilizers, dibasic lead phosphite, antimony oxide, zinc borate, molybdates and so forth and mixtures of the same. Titanium oxide, red iron oxide, phthalocyanine blue or green or other color pigments or dyes can be used. The pigments, dyes and other dry additives preferably are dispersed or dissolved in one or more plasticizers before being added to the plasticized vinyl chloride polymer compositions. These compounding ingredients are used in effective amounts by weight to control color, mildew, stabilization, viscosity and so forth of the plasticized vinyl chloride polymer.

The vinyl chloride polymer composition may contain suitable blowing or foaming agents such as sodium bicarbonate, and organic agents like 1,1'-azobisformamide, 4,4'-oxybis(benzenesulfonylhydrazide), p-toluenesulfonyl hydrazide and so forth to form a cellular or foamed vinyl chloride polymer composition layer or sheet on fusing. The blowing agents may require an activator.

Vinyl chloride polymer blending or extender resins, also, can be used in the compositions in a minor amount by weight as compared to the vinyl chloride polymer composition.

The ingredients forming the vinyl chloride polymer composition may be charged to and mixed together in any one of several mixing devices such as a Ross Planetary mixer, Hobart dough type mixer, Banbury, 2-roll rubber mill, Nauta mixer and ribbon blender and so forth.

The vinyl chloride polymer composition can be formed into layers or films which can be unsupported or supported (preferred). Where a vinyl chloride polymer plastisol composition is used, it may be cast on a release surface and heated to fuse it to form a film. Where a plasticized suspension grade vinyl chloride polymer composition is used, it can be calendered or extruded and fused to form a film. Temperatures may vary from about 200° to 400° F. However, it is preferred that in either case the compounded vinyl chloride polymer compositions be supported or have a backing. In the case of the supported vinyl chloride polymer composition, the backing can be a woven fabric (drill, scrim, cheesecloth, and so forth), a knit fabric, a nonwoven fabric, paper, etc. The fabric can be made of cotton, cellulose, nylon, polyester, aramid, rayon, acrylic or glass fibers or cords or mixtures of the same. It may be necessary in some instances to treat the fabric with an adhesive coating or dip to adhere or to adhere better to the vinyl chloride polymer composition.

The surface of the vinyl chloride polymer composition film or layer, supported or unsupported, is preferably printed with a suitable vinyl chloride polymer receptive ink to form desirable and novel patterns and designs. Such inks are well known and can be applied by various methods of printing such as by gravure, flexography, screen printing, jet printing, web printing and so forth. See "Modern Plastics Encyclopedia 1980–1981," pages 464–465. The printing operation may be repeated for up to five times or more to vary the colors and designs at temperatures of from about 150° to 165° F. for each printing step.

The vinyl chloride polymer substrate, supported or unsupported, printed or unprinted is preferably embossed to texture the vinyl chloride layer to provide a pattern or design for aesthetic or functional purposes. Embossing of thermoplastic films, layers or sheets is well known and is usually carried out by passing the film between an embossing roll and a backup roll under controlled preheating and post cooling conditions. See "Modern Plastics Encyclopedia 1980–1981," pages 454–455. Additional decorating or printing can sometimes be done with the above stated inks over the embossed vinyl chloride polymer surface for aesthetic purposes. The other polymeric substrates may be similarly processed as appropriate.

The aqueous based polymer coating for use as the outer or top coating for various substrates, especially on a vinyl chloride polymer substrate, is prepared by mixing a crosslinkable acrylic polymer aqueous latex with an amino resin, preferably an alkylated amino resin crosslinking agent, and a suitable crosslinking catalyst. The coating is applied to the substrate and cured at a temperature of from between about 150° F. and 320° F. and preferably from about 200° F. to about 280° F. to cause curing or crosslinking of the acrylic polymer and the amino resin. The coating may be applied directly to the vinyl chloride polymer substrate, with or without backing, with or without printing and with or without embossing.

The crosslinkable acrylic polymer aqueous latex is desirably prepared using conventional emulsion polymerization techniques which are well known in the art and well documented in the literature. Generally, any conventional anionic or nonionic emulsifiers known to the art and to the literature can be utilized in the emulsion polymerization. Suitable emulsifiers are set forth in McCutcheon's "Detergents and Emulsifiers," 1978, North American Edition, Published by McCutcheon's Division, MC Publishing Corporation, Glen Rock, N.J. Specific examples of conventional anionic emulsifiers which can be utilized include sodium alkyl sulfate, wherein the alkyl has from about 8 to about 22 carbon atoms such as sodium lauryl sulfate, sodium stearyl sulfate, various sodium alkyl benzene sulfonates wherein the alkyl has from about 8 to about 22 carbon atoms such as sodium dodecyl benzene sulfonate. Phenyl type phosphates, sulfosuccinates and disulfonated alkyl benzene derivatives having a total of from 8 to 22 carbon atoms, various fatty acid salts having from 12 to 22 carbon atoms, and various rosin acid salts can also be utilized. The amount of emulsifiers used is generally from about 1 to about 6 parts by weight per 100 parts by weight of monomer. Examples of nonionic emulsifiers include alkylaryl polyester alcohols, block copolymers of ethylene oxide and propylene oxide, and polyalkylene glycol ether. Seeding techniques can be used, as desired to achieve more uniform latex polymer particle sizes, but are not generally necessary.

Desirably, the monomer or comonomer composition utilized in the polymerization of the acrylic polymer includes at least one monomer free of both carboxylic acid functionality and hydroxyalkyl ester functionality and having a carbon-carbon double bond. Preferably, the majority of monomers by weight utilized in the polymerization of the acrylic polymer are alkyl acrylates or alkyl methacrylates with the alkyl portion having from 1 to about 16 carbon atoms and preferably from 1 to about 10 carbon atoms. Vinyl substituted aromatics having from about 8 to about 12 carbon atoms can also be utilized in the acrylic polymer in minor amounts. Examples of acrylates and methacrylates include ethyl acrylate, butyl acrylate, 2-ethylhexyl acrylate, octyl acrylate, stearyl acrylate, lauryl acrylate, methylmethacrylate, t-butylmethacrylate, propylmethacrylate, and the like, with mixtures of methylmethacrylate and 2-ethylhexyl acrylate being preferred. Examples of vinyl substituted aromatics which may be used include styrene, alphamethylstyrene, and the like.

Small amounts of multifunctional acrylate monomers containing two or more carbon-carbon double bonds including diacrylate and triacrylate monomers such as ethylene glycol dimethacrylate, diethylene glycol diacrylate and trimethylolpropane triacrylate may also be used in the polymerization of the acrylic polymer to create branched polymers. Various vinyl compounds such as divinyl benzene can also be used. The amount of optional multifunctional acrylate which can be utilized is generally in the range from about 0.005 to 10 parts by weight per 100 parts by weight of total monomer.

To impart crosslinkability to the acrylic polymer, effective amounts of crosslinkable comonomers having a carbon-carbon double bond and containing carboxylic acid functionality, hydroxyalkyl ester functionality, or both carboxylic acid and hydroxyalkyl ester functionalities are utilized in the acrylic latex polymer. Examples of crosslinkable comonomers which may be used include unsaturated mono- or dicarboxylic acids containing from 3 to about 12 carbon atoms, hydroxyalkyl acrylates wherein the alkyl contains from 2 to about 6 carbon atoms, hydroxyalkyl methacrylates wherein the alkyl contains from 2 to about 6 carbon atoms, and hydroxyalkyl esters of unsaturated dicarboxylic acids, wherein the alkyl portion has from about 2 to about 6 carbon atoms and the ester has a total of from about 5 to about 18 carbon atoms. To achieve adequate shelf-stability, cure properties and coating properties, the acrylic latex compositions should generally contain from about 2 to about 9 or 10 weight percent hydroxyl functional monomers.

Examples of carboxylic acids containing comonomers include various mono- and di-carboxylic acids and anhydrides such as itaconic acid or anhydride, maleic acid or anhydride, fumaric acid, allyl acetic acid, acrylic acid and methacrylic acid. Comonomers having a hydroxy- alkyl ester functionality include hydroxyethyl acrylate and methacrylate, hydroxypropyl acrylate and methacrylate, and the like. Comonomers having both hydroxy- alkyl ester and carboxylic acid functionalities include the partial hydroxyalkyl esterification product of a dicarboxylic acid and a diol, such as the condensation product of fumaric acid or itaconic acid with a diol such as ethylene or propylene glycol. Acid monomers can be used in small amounts such as less than 4 or 5 weight percent and more preferably less than 1 or 2 weight percent to enhance shelf-stability, but are generally not desired or required. Various mixtures of monomers and crosslinkable comonomers can be utilized to produce the acrylic polymers used in the coating composition.

A particularly preferred latex polymer consists of from about from 2 to about 9 or 10 parts by weight of hydroxyethyl acrylate, from about 15 to 40 parts by weight of 2-ethylhexyl acrylate, and from about 50 to about 83 parts by weight of methyl methacrylate, such that the total of the monomers is 100 parts by weight.

The latex polymer compositions of the invention are preferably prepared without chain-transfer agents which are commonly used in many prior art latex compositions. It has been found that latex compositions of the invention exhibit substantially better scrub resistance when chain-transfer agents are not used.

The amino resins are well known to the art and well documented in the literature, as for example, in "Aminoplastics," Vale et al. Iliffe Books Ltd., London, 1964; "Amino Resins," Blair, Reinhold Publishing Corporation, New York, 1959; "Modern Plastics Encyclopedia of Polymer Science and Technology," John Wiley & Sons, Inc., Vol. 2, 1965, pages 1 to 94, all of which are hereby incorporated by reference.

Preferably, the amino resin crosslinking agent can be various amino-formaldehyde resins known to the literature and to the art such as an alkylated benzoguanamine-formaldehyde, an alkylated urea-formaldehyde or, more preferably, an alkylated melamine-formaldehyde resin. Mixtures of these resins can also be used. Other amino-formaldehyde resin crosslinking agents which may be utilized include alkylated dihydroxyethyleneurea-formaldehyde, alkylated glycolurilformaldehyde, alkylated acetoguanamine-formaldehyde, alkylated aniline-formaldehyde, and the like. Effective amounts of the crosslinkable acrylic polymer and amino resin crosslinking agent are employed to provide a stain resistant, crosslinked layer having good durability and flexibility and having good adhesion to various substrates, such as vinyl chloride polymer substrate on curing and crosslinking. Generally, the amount of crosslinking agent used is in the range from about 1 to about 50 parts by weight per 100 parts by weight of the crosslinkable acrylic polymer on a dry basis. These materials are cured at a temperature of from between about 150° F. and 320° F. and preferably from about 200° F. to about 280° F. in the presence of an acidic crosslinking catalyst like boric acid, phosphoric acid, acid sulfates, hydrochlorides, phthalic anhydride or acid, oxalic acid or its ammonium salts, sodium or barium ethyl sulfates, aromatic sulfonic acids such as p-toluene sulfonic acid (preferred) and the like. The amount of crosslinking catalyst used is generally from about ½ part to about 10 parts by weight per 100 parts by weight of acrylic polymer on a dry basis. A preferred crosslinking resin which can be used either alone or in combination with other amino resin crosslinking agents to obtain a coating composition exhibiting good stain cleanability and shelf-stability is melamine-formaldehyde resin. The latex compositions of the invention generally are adjusted and utilized at near neutral pH, such as from about 6 to 10, and more preferably from about 7–9. Accordingly, a predominance of non-ionic surfactants and the incorporation of amide functional monomers into the acrylic polymer, are not required as with the compositions of Rehfuss et al. Prior to curing, flatting agents or other conventional additives can be added in conventional amounts to the acrylic coating mixture.

In accordance with a preferred aspect of the invention, polyvinyl alcohol is included in the coating compositions of the invention to further improve shelf-stability and to reduce gloss. The addition of polyvinyl alcohol is also believed to improve abrasion resistance and solvent resistance. Suitable polyvinyl alcohols generally include any of various commercially available polymers having a weight average molecular weight of from about 20,000 to about 200,000 and more preferably from about 25,000 to about 35,000. Even relatively small amounts of polyvinyl alcohol (PVOH) have been found to reduce gloss and increase shelf-stability. However, PVOH is desirably used in an amount of from about 3 to about 50, more desirably from about 6 to about 50, and most preferably from about 10 or 12 to about 18 or 20 parts by weight per 100 parts by weight of the total weight (dry basis) of the acrylic latex polymer and the amino crosslinking agent or agents.

The compositions of the invention generally contain flatting agents to reduce the gloss of substrates which have been coated. Reduced gloss is aesthetically desired for most wallcoverings and upholstery applications. Conventional flatting agents such as silica and silicates are generally utilized in conventional amounts such as from 5 to 50, and more preferably from 10 to 30 parts by weight per 100 parts by weight of the total weight (dry basis) of the acrylic polymer and amino crosslinking agents. It has been discovered that the dispersibility and redispersibility (i.e. the ability to redisperse after settling) of flatting agents, particular silica flatting agents, can be dramatically and unexpectedly improved by adding polysiloxanes to the coating composition. Particularly preferred polysiloxanes include polyether and polyester modified polydimethylsiloxanes, and polyester modified hydroxyl functional polydimethylsiloxanes. The most preferred polysiloxane is aminoethylaminopropyldimethoxysilyl end-blocked polydimethylsiloxane. It is believed that the polydimethylsiloxane adsorbs on silica thereby stabilizing the silica dispersion by a steric stabilization mechanism. Polydimethysiloxanes which contain functionality (e.g. basic) that will adsorb strongly on the acidic silica are expected to be most efficient. Effective amounts of polydimethylsiloxane generally range from about 0.01 to about 25 parts by weight, and more desirably from about 0.1 to about 10 parts by weight, and most preferably from about 0.1 to about 5, per 100 parts by weight (dry basis) of acrylic polymer and crosslinking agent or agents. The most effective amounts depend on the particular polydimethylsiloxane being used and the amount of flatting agent added to the composition.

It is generally desirable to add surfactants to the coating composition to obtain good substrate wetting and uniform coating of the substrate. It has been discovered that unexpected improvements in solvent and scrub resistance are achieved when certain dialkyl esters of sulfosuccinic acid, wherein the alkyl group contains from about 6–30 carbon atoms, are added to the composition. A particular preferred surfactant is sodium bis(2-ethylhexyl) sulfosuccinate which is available from Permuthane Corporation under the product designation "KM-10–1610".

It has been found that, in addition to providing for better solvent and scrub resistance, the dialkyl ester sulfosuccinic acid surfactants can be used in generally smaller amounts than other conventional surfactants. Suitable amounts of dialkyl ester sulfosuccinic acid surfactant range from about 0.5 to about 10 parts, and more preferably from about 1.0 to 5 parts by weight per 100 parts by weight of the total weight (dry basis) of the acrylic polymer and amino curing agent or agents.

The coating compositions of the invention are generally free of any intentionally added volatile organic compounds, preferably do not contain any or contain only incidental amounts of volatile organic compounds. The latex coating compositions of the invention typically contain less than about 1.0 percent volatile organic compounds by weight.

The stain resistant laminates of the present invention are particularly well suited for use as wallcoverings, tablecloths, shoe uppers, luggage exteriors, upholstery, vehicle interiors and seats, golf bags and other sporting goods.

A typical low gloss latex coating composition for use with polyvinyl chloride wallcoverings or upholstery is as follows:

| Formulation of Waterborne Acrylic Coating | | |
|---|---|---|
| Component | PHR | Function |
| Acrylic Latex | 90 | Coating |
| Melamine | 10 | Crosslinker |
| PTSA | 6.5 | Catalyst |
| Silica | 22.5 | Flatting Agent |
| Dow Corning 478 | 1.3 | Stabilizer |

-continued

Formulation of Waterborne Acrylic Coating

| Component | PHR | Function |
|---|---|---|
| Wetting Agent | 1.6 | Substrate Wetting |
| PVOH | 10 | Shelf Life, Solvent/Abrasion |

While the invention is primarily intended for use as a coating composition for vinyl chloride polymer sheet materials, it may also be advantageously used as a coating for various polymeric or cellulosic materials such as paper, fabrics made from synthetic or natural fibers, nylon, polyester or acrylic substrates.

The invention will be better understood by reference to the following examples.

EXAMPLES

Preparation of Latexes

The latexes (emulsion polymers) used were mostly prepared in quart size glass bottles using a batch-wise seeded emulsion polymerization process. The basic recipe and the polymerization procedures are given in Table I. The solids content of the latexes was in the 46–47% range. The pH of the "as prepared" latexes (i.e., before pH adjustment subsequent to polymerization) was in the 3–4 range.

TABLE I

| Ingredient | Parts Wet | Parts Dry |
|---|---|---|
| Preparation of Seed Latex Recipe | | |
| Deionized Water | 88.5 | — |
| Dowfax 2A1[(1)] (10%) | 3.6 | 0.36 |
| Sequestrene Na$_3$T[(2)] | 0.075 | 0.075 |
| Styrene | 6.0 | 6.00 |
| K$_2$S$_2$O$_8$ | 0.15 | 0.15 |
| Deionized Water | 15.00 | — |
| Total | 113.325 | 6.585 |
| Seed Latex | 113.325 | 6.585 |
| Surfactant(s)* | As needed | |
| Monomers* | 94.0 | 94.0 |
| K$_2$S$_2$O$_8$ | 0.2 | 0.2 |
| Deionized Water | 10.0 | — |

[(1)]Sodium dodecyl diphenylether disulfonate - product of Dow Chemical Co.,; diluted to 10% active concentration.
[(2)]Trisodium ethylenediamine tetraacetate trihydrate-product of Ciba-Geigy. Chelating Agent.
*The specifics of surfactants and monomers used in various experiments are given in appropriate tables.

Procedure

The ingredients were mixed in the order given above, purged with nitrogen, and reacted at 65° C. for 2 hours. At the end of the reaction, the product was cooled to room temperature. No coagulum was formed and no filtering was necessary.

Procedure

The ingredients were mixed in the order given above, purged with nitrogen, and reacted at 65° C. to >99% monomer conversion. At the end of the reaction, the product was cooled to room temperature and filtered through a fine paint filter to remove the coagulum.

Preparation of Coating

The pH of latex was adjusted to the desired level (7–9 pH units) with sodium hydroxide, triethanolamine, ammonium hydroxide, or sodium bicarbonate, before the addition of other ingredients such as the external crosslinking agent (e.g., Cymel 303 -hexamethoxymethyl melamine; a product of American Cyanamid Co.), wax, and flatting agents. All ingredients were slowly added to the latex and mixed/dispersed well. Para-toluene-sulfonic acid (catalyst) was diluted to 10 percent concentration in water, adjusted to a pH of 7.3–7.5, and added to the coating immediately prior to use.

Application of Coating

The substrates used in this work were plasticized polyvinyl chloride (PVC or vinyl) laminates like those described in the U.S. Pat. 4,603,074 but without the stain resistant coating of the above patent. An 8 ½"×16" piece of the vinyl was taped to a flat glass plate maintained at 175°–185° F. using radiant heat. The coatings were applied to the substrates using a wire-wound rod (Meier Rod), allowed to dry under radiant heat for 1 minute, and then cooled to room temperature. The coatings were further cured in a forced air oven maintained at 250° F. Cure times were 1–3 minutes.

The coating thickness (calculated from coat weights) was in the 10–30 μm range.

Stain Resistance/Cleanability Testing

Samples were cut from the coated sheet, marked with the stain, and allowed to age for 10 minutes (for short-term stains) or for 16–24 hours (for long-term stains). The stain resistance or ease of cleanability of the coating was then tested first by wiping the stain with a dry paper tissue, spraying with the cleaning agent (e.g. 409 Household Cleaner, isopropanol) and wiping with a paper tissue, or spraying with the cleaning agent and hand scrubbing with a nylon bristle brush. A maximum of 50 double scrubs was tried.

Example 1

Table II lists the ingredients (except deionized water) for a series of latexes that were prepared by varying the amount of surfactant (Aerosol OT). Details of the preparation procedures are given in Table I. The reaction time was 6 hours. Stable latexes were obtained. Even at the lowest level of surfactant used, the coagulum level was not excessive.

Each of the four latexes A–D was formulated into a coating containing (on dry parts basis) 18.75 parts of latex, 0.135 parts of KM-10–1610 wetting agent (an anionic surfactant obtained from Permuthane Coatings, Peabody, Mass.), sodium hydroxide to adjust pH to 8.3–8.4, and 2.1 parts Cymel 303. Cleanability (10 minute stain) results for these coatings are given in the bottom part of Table II. The data show that all of the coatings had excellent cleanability since both the ball point pen and the marker stains could be readily cleaned with a household cleaner and without the use of solvent. Furthermore, even repeated staining at the same spot did not affect the cleanability.

For the uncoated substrates, it was observed that the stain was very dark even after 50 scrubs with the 409 Household Cleaner.

TABLE II

| Ingredients+ | Latex: -A | -B | -C | -D |
|---|---|---|---|---|
| Seed Latex | 6.585 | 6.585 | 6.585 | 6.585 |
| Aerosol OT[(1)] | 0.6 | 1.0 | 1.5 | 2.0 |
| Methyl methacrylate | 62.0 | 62.0 | 62.0 | 62.0 |
| 2-Ethylhexyl acrylate | 26.0 | 26.0 | 26.0 | 26.0 |

TABLE II-continued

| | | | | |
|---|---|---|---|---|
| Hydroxyethyl acrylate | 6.0 | 6.0 | 6.0 | 6.0 |
| $K_2S_2O_8$ | 0.2 | 0.2 | 0.2 | 0.2 |
| Latex Solids, % | 46.3 | 46.3 | 46.3 | 46.5 |
| Coagulum[2] | 0.48 | 0.03 | 0.03 | 0.01 |

Stain Resistance/Cleanability of Coatings

| | | Scrubs to Clean (409 Household Cleaner) | | |
|---|---|---|---|---|
| Latex | Stain Type | 1st Stain | 2nd Stain | 3rd Stain |
| A | Carter Marker (Black) | 25 | 25 | Not tested |
| B | Carter Marker (Black) | 10 | 15 | 20 |
| C | Carter Marker (Black) | 20 | 20 | 20 |
| D | Carter Marker (Black) | 20 | 20 | 20 |
| A | Ball Point Pen (Bic Black/Blue) | Not tested | | |
| B | Ball Point Pen (Bic, Black/Blue) | 3 | 3 | 3 |
| C | Ball Point Pen (Bic, Black/Blue) | 3 | 3 | 3 |
| D | Ball Point Pen (Bic, Black/Blue) | 3 | 3 | 3 |

+ On dry parts basis. Rest was deionized water.
[1] Dioctyl ester of sodium sulfosuccinic acid - a product of American Cyanamid Co.
[2] Part per hundred parts of monomers.

Example 2

A $2^2$ experimental design with center point was used to evaluate the effect of variation of latex polymer/Cymel 303 ratio and the catalyst concentration on the properties of the coatings. The latex used was identical to Latex B of Table II (Example 1). The coating compositions and the stain cleanability data are given in Table III. All of the coatings gave adequate cleanability and thus fall within the scope of the present invention. The surface of the coatings was unaffected by scrubbing.

The cleanability of the sample coated with Coating No. 6 (Table III) was checked again after 6 weeks storage in the laboratory. For the 10 minutes stains, both the ball point pen (black) and the Carter Marker (black) stains could be cleaned in 10 scrubs with the 409 Household Cleaner, and the lipstick stain could be wiped off with the paper tissue. To clean the overnight (16–20 hours) stains, it took 20 scrubs with 409 Cleaner for the ball point pen, 30 scrubs with isopropyl alcohol (IPA) for the Carter Marker, and 2 scrubs with IPA for the lipstick.

TABLE III

Effect of Latex/Cymel 303 Ratio and Catalyst Level

| | Coating Composition[1] | | | | |
|---|---|---|---|---|---|
| Coating No. | Latex | Cymel 303 | Catalyst | Stain Cleanability[2] | Relative Rating |
| 1 | 17 | 3 | 0.2 | Very light stain left after 30 scrubs | 4 |
| 2 | 19 | 1 | 0.2 | Stain barely visible after 50 scrubs | 3 |
| 3 | 17 | 3 | 0.4 | Stain barely visible after 50 scrubs | 2 |
| 4 | 19 | 1 | 0.4 | Stain barely visible after 50 scrubs | 2 |
| 5 | 18 | 2 | 0.3 | Stain barely visible after 50 scrubs | 3 |
| 6 | 18 | 2 | 0.4 | Stain gone after 25 scrubs | 1 (Best) |

[1] Dry parts
[2] Carter marker (black) stain (10 minutes); 409 Household Cleaner.

Example 3

Another latex (Latex E) was prepared following the same procedure and recipes as given earlier (Tables I and II) except that instead of Aerosol OT (Table II), 0.72 parts (dry basis) of KM-10–1610 wetting agent was used as the surfactant during the polymerization of the latex. Coatings were prepared from Latex E using the recipes given in Table IV. The stain cleanability results for these coatings are given in Table IV. The data indicate that any of the various bases may be used to adjust the pH of the latex without significantly affecting the stain cleanability.

TABLE IV

| Coating No.: | 7 | 8 | 9 |
|---|---|---|---|
| Contents[1] | | | |
| Latex E | 18 | 18 | 18 |
| Dowfax 2A1 | 0.1 | 0.1 | 0.1 |
| pH Adjustment[2] | Triethanol-amine | Sodium Hydroxide | Ammonium Hydroxide |
| Cymel 303 | 2.0 | 2.0 | 2.0 |
| Catalyst | 0.4 | 0.4 | 0.4 |
| Stain | | | |
| Carter Marker (10 Minutes) | 20 Scrubs witH 409 Cleaner | 40 Scrubs with 409 Cleaner | >50 Scrubs with 409 Cleaner |
| Lipstick (Overnight) | Wipes clean with dry paper tissue | | |
| Ball Point Pen (Overnight) | 50 Scrubs with 409 Cleaner | 40 Scrubs with 409 Cleaner | 50 Scrubs with 409 Cleaner |
| Carter Marker | Stain washes off with IPA. No scrubbing neeeded. | | |

[1] All parts are on dry basis.
[2] To Ph ≈ 8.

Example 4

A latex (Latex F) was prepared with a recipe essentially identical to that for Latex E by using the following procedure. To a 5-gallon reactor vessel, 10712.53 gms of deionized water, 93.87 gms of a 45 percent solution of Dowfax 2A1, 8.8 gms of Sequestrene $Na_3T$, and 704.0 gms of styrene were added. The temperature was adjusted to 65° C. and a solution containing 17.60 gms of potassium persulfate and 1760 gms of deionized water was added to the reactor while stirring continuously. The reactor was purged with nitrogen and the reactants were allowed to react for 2 hours. The reactants were cooled to room temperature and dropped into a container through a filter. The monomer conversion was essentially 100 percent and no coagulum was formed during the preparation of this seed latex.

To a clean 5-gallon reactor, 5780.0 gms of the above seed latex and 136.0 gms of a 27 percent solution of KM-10-1610 wetting agent were added. Separately, a mixture (Mixture A) containing 3162 gms of methyl methacrylate, 1326 gms of 2-ethylhexyl acrylate, and 306 gms of hydroxyethyl acrylate was prepared and mixed well. Seven hundred and fourteen (714) gms of this mixture was added to the reactor which was maintained at 65° C. under a nitrogen blanket. A solution containing 10.2 gms of potassium persulfate and 510 gms of deionized water was then added to the reactor. The rest of Mixture A (4080 gms) was added to the reactor at a constant rate over a period of 3 hours. The reactants were allowed to react further for 2 more hours and then cooled to room temperature. Sixty-eight (68) gms of a 45 percent solution of Dowfax 2A1 was added to the reactor and mixed well. The monomer conversion was essentially 100 percent and only a trace of coagulum was formed. The number average particle diameter of the latex was determined (by Capillary Hydrodynamic Fractionation technique) to be ~150 nm.

Coatings from Latex F were prepared according to the recipes given in Table V, applied to vinyl substrates and cured at 250° F. for 3 minutes. As might be expected, the coatings which contained microcrystalline wax and silica (Coatings 11–14) were less glossy and much duller than coating No. 10. The stain cleanability data are given in Table V. Cleanability worsens significantly with the addition of wax and silica to the coating. This is not unexpected. However, the stains are still cleanable without the use of acetone or other harsh solvents.

Example 5

Carboxylic acid functional monomers are sometimes polymerized with the other monomers to impart increased colloidal stability to the latexes. Latexes G and H were prepared to determine the effect of methacrylic acid monomer on stain cleanability of the coatings. Latexes were prepared with the recipes given in Table VI and using the procedure given in Table I.

Coatings were prepared from these latexes by mixing together (on dry basis) 18.75 parts of latex, 0.135 parts KM-10-1610, adjusting the pH to 8.3 with sodium hydroxide, and adding 2.1 parts Cymel 303, and 0.4 parts para-toluenesulfonic acid catalyst. The Carter Marker stains (10 minutes) for the coatings could be cleaned in 20–30 scrubs with 409 Cleaner, indicating that a small amount of carboxylic functional monomer (about 1 percent by weight) had no adverse effect on stain cleanability.

TABLE VI

| Ingredient[1] | Latex | |
| --- | --- | --- |
|  | G | H |
| Seed Latex | 6.585 | 6.585 |
| Aerosol OT | 0.67 | 1.00 |
| Methyl methacrylate | 61.0 | 62.0 |
| Methacrylic acid | 1.0 | — |
| 2-Ethylhexyl acrylate | 26.0 | 26.0 |
| Hydroxyethyl acrylate | 6.0 | 6.0 |
| $K_2S_2O_8$ | 0.2 | 0.2 |
| Latex Solids, % | 46.2 | 46.5 |
| Coagulum[2] | 0.27 | 0.28 |

[1]On dry parts basis. Remainder was deionized water.
[2]Parts per 100 parts monomers.

TABLE V

| Coating No.: | 10 | 11 | 12 | 13 | 14 |
| --- | --- | --- | --- | --- | --- |
| Contents[1] | | | | | |
| Latex F[2] | 18 | 18 | 16 | 16 | 14 |
| Jonwax 22[3] | — | 1 | 1 | 1 | 1 |
| Syloid 820[4] | — | 3.4 | 3.4 | 3.4 | 3.4 |
| Cymel 303 | 2 | 2 | 4 | 4 | 6 |
| Catalyst | 0.4 | 0.6 | 0.4 | 0.6 | 0.4 |
| Stain Cleanability | | | | | |
| Stain | | | | | |
| Carter Marker (Overnight) | 30 Scrubs with 409 Cleaner OR | Not cleanable with 409 Household Cleaner. | | | |
|  | Washes off with IPA (No Scrubbing) | 50 Scrubs with IPA | 50 Scrubs with IPA | 30 Scrubs with IPA | 50 Scrubs with IPA |
| Ball Point Pen (Overnight) | Not Done | 50 Scrubs with IPA | 40 Scrubs with IPA | 50 Scrubs with IPA | 30 Scrubs with IPA |
| Ball Point Pent (10 Minutes) | Not Done | 30 Scrubs with IPA | 30 Scrubs with 409 Cleaner | 20 Scrubs with 409 Cleaner | 20 Scrubs with 409 Cleaner |

[1]All parts are on a dry basis
[2]pH adjusted to ~8 with triethanolamine.
[3]Microcrystalline wax - a product of S. C. Johnson Wax.
[4]Silica Flatting Agent from Davison Chemical, W. R. Grace and Co.

Example 6

This example illustrates the unexpected beneficial effects relating to dispersibility and redispersability of silica flatting agents in the coating when certain polydimethylsiloxanes (PDMS) are added to the composition. The most effective PDMS was found to be Dow Corning 478 Fluid (an aminoethylaminopropyl-dimethoxysilyl-end-blocked polydimethylsiloxane).

The latex used in this study was identical to Latex F (Example 4). All coatings contained (on a dry basis) 10.8 gm of latex, 1.2 gm of "Cymel 373" partially methylated melamine-formaldehyde resin from Cytec, formally American Cyanamid), 0.04 gm of "Drew L198" defoamer (a product of Drew Chemical Corporation), and 2.7 gm of "Syloid 820" silica flatting agent (a product of W. R. Grace and Co.). The total solids content for each of the coating compositions (6-1 through 6-5) was about 34 percent. The effect of the addition of varying levels of Dow Corning 478 Fluid (a product of Dow Corning Corporation) on the settling and redispersability is shown in Table VII.

TABLE VII

| Coating | Dow Corning 478 (Parts)* | After 4 Days Storage | |
|---|---|---|---|
| | | Settling Fallout (Inches) | Redispersability |
| 6-1 | 0 | 0.5 | Not Redispersible |
| 6-2 | 0.63 | 0.3 | Dispersible |
| 6-3 | 1.25 | little | Easily Dispersed |
| 6-4 | 1.88 | little | Easily Dispersed |
| 6-5 | 2.5 | little | Easily Dispersed |

*Parts/100 parts latex and Cymel 373. All parts are on dry basis.

The data in Table VII show that silica, when used in the coating, has a tendency to settle down due to its higher specific gravity relative to that of the other components. Furthermore, once settled, silica tends to form a cake and is not easily redispersible. The addition of small amounts of Dow Corning 478 to the coating decreases the rate of settling of silica and also makes the amount settled easily dispersible. A uniform dispersion of silica in the coating is necessary to maintain product uniformity and quality.

Example 7

It is well known in the art that to obtain a good quality, pin-hole free, uniform coating, the coating composition must wet the substrate. Surfactants are often added to waterborne coating compositions to improve their ability to wet a substrate. A number of surfactants were evaluated in the coating compositions of the present invention to impart good wettability across a wide variety of substrates. All substrates contained polyvinyl chloride and varying amounts of plasticizers. The amounts of various surfactants used were the minimum required to achieve good wetting for all three substrates x, y and z. After the application, the coatings were cured at 250° F. for 1 minute in a forced air oven and subjected to 200 scrub cycles with isopropanol. The following results were obtained.

TABLE VIII

| Sample # | Surfactant | Surfactant Level* | Isopropanol Scrub Resistance Vinyl Substrate | | |
|---|---|---|---|---|---|
| | | | X | Y (Least Plasticizer) | Z (Most Plasticizer) |
| 7-1 | None | — | Pass | Not Tested | Did Not Wet |
| 7-2 | KM-10-1610$_{(1)}$ | 0.54 | Pass | Pass | Pass |
| 7-3 | Zonyl FSP$_{(2)}$ | 0.70 | Pass | Pass | Fail |
| 7-4 | Zonyl FSA$_{(2)}$ | 1.50 | Pass | Pass | Fail |
| 7-5 | Silwet L77$_{(3)}$ | 7.00 | Pass | Fail | Fail |
| 7-6 | Silwet L7001$_{(4)}$ | 7.00 | Pass | Fail | Fail |
| 7-7 | Dowfax 2A1$_{95)}$ | 4.50 | Fail | Fail | Fail |

*parts (dry) per 100 parts (wet) coating
$_{(1)}$Sodium bis(2-ethylhexyl) sulfosuccinate surfactant - Permuthane Corporation.
$_{(2)}$Fluorocarbon Surfactant - DuPont
$_{(3)}$A polyalkyleneoxide modified heptamethyltrisiloxane non-ionic surfactant - Union Carbide Corporation.
$_{(4)}$A polyalkyleneoxide modified polydimethysiloxane non-ionic surfactant - Union Carbide Corporation.
$_{(5)}$Sodium dodecyl diphenylether disulfonate - Dow Chemical Co.

These results shown in Table VIII indicated that "KM-10–1610" was the most effective surfactant (least amount needed to wet all three substrates). Furthermore, it was the only surfactant of the many tried which provides both good wetting and isopropanol scrub resistance for all three substrates.

Example 8

It was found that the addition of polyvinyl alcohol (PVOH) to the coating composition improves shelf-stability, especially when a more reactive (i.e. partially alkylated) melamine-formaldehyde resin is used. Also, PVOH provides some reduction in gloss. The coatings contained (all parts on dry basis) 90 gms of latex, 10 gms of Cymel 373 melamine-formaldehyde resin (Cytec Corporation), 0.2 gm Drew L198 defoamer, 22.5 gm HP250 silica flatting agent, 1.6 gm KM-10-1610 surfactant, 1.25 gm Dow Corning 478, 6.5 gm p-toluene sulfonic acid and varying amounts of PVOH as listed in Table IX.

TABLE IX

| Example | PVOH | Gloss | Shelf Stability |
|---|---|---|---|
| 8-1 | 0.0 | 7.5 | <18 hrs |
| 8-2 | 3.2 | 7.1 | <18 hrs |
| 8-3 | 9.8 | 6.6 | 26 hrs |
| 8-4 | 12.8 | 6.0 | >6 days |
| 8-5 | 15.9 | 6.1 | >6 days |
| 8-6 | 18.1 | 5.4 | >6 days |

These data clearly show the benefits of PVOH addition for improving shelf-stability and reducing gloss. The addition of PVOH, at the levels tested, had no adverse effect on the isopropanol (IPA) scrub resistance.

Example 9

The addition of PVOH to the coating was also found to provide increased abrasion resistance to the coating. This is illustrated by the data set forth in Table X.

TABLE X

| Examples | Flatting Agent | PVOH* | Gloss % | Shelf Stability | Relative Abrasion Resistance** |
|---|---|---|---|---|---|
| 9-1 | HP-250 | 0 | 5.3 | <1 day | 4 |
| 9-2 | Syloid 820 | 0 | 4.7 | <1 day | 4 |
| 9-3 | HP-250 | 34.0 | 3.2 | >12 days | 1 |
| 9-4 | Syloid 820 | 34.0 | 3.1 | >12 days | 2 |

*Parts/100 part latex and Cymel 373 (dry basis)
**Wyzenbeck Abrasion Test, ASTM D4157 (wire screen), 1000 cycles. Rating on a scale of 1 to 4 (lower the better).

Example 10

The amount of functional monomers (e.g. hydroxyethyl acrylate (HEA), hydroxypropyl methacrylate (HPMA) in the latex polymer used in the coating must be controlled to provide good shelf-stability to the latex and coating while at the same time obtaining sufficient cure and good coating properties.

A series of latexes were prepared with the monomer ratios set forth in Table XI.

TABLE XI

| Latex | Polystyrene Seed | HEA | Methylmeth-acrylate | 2-Ethylhexyl Acrylate |
|---|---|---|---|---|
| 10-1 | 6 | 6 | 62 | 26 |
| 10-2 | 6 | 8 | 62 | 24 |
| 10-3 | 6 | 10 | 62 | 22 |
| 10-4 | 6 | 12 | 60 | 22 |

Stable latexes were obtained in all cases except 10-4 which coagulated completely in the polymerization bottle. Also Latex 10-3, though stable was significantly more viscous (Brookfield viscosity≅1600 cps) than Latex 10-1 (75.5 cps) and 10-2 (267.5 cps). When these latexes were compounded into coatings with Cymel 303 and p-toluene sulfonic acid, the coating from Latex 10-3 was much thicker (paste-like) than the corresponding coatings from the other two latexes. Thick coatings are difficult to process in a production environment.

Example 11

In separate experiment it was determined that the amount of functional monomer can be as low as 2 pphm (parts per hundred parts monomers) to provide adequate IPA resistance.

TABLE XII

| Latex | Polystyrene Seed | HEA | Methacrylic Acid | Methyl methacrylate | 2-Ethylhexyl Acrylate |
|---|---|---|---|---|---|
| 11-1 | 6.0 | 2.0 | 0.7 | 36.7 | 54.6 |
| 11-2 | 6.0 | 4.0 | 0.7 | 40.0 | 49.3 |

Coatings made from Latexes 11-1 and 11-2 (Table XII) were applied to vinyl laminates and cured at 250° F. for 1 minute. Both coatings passed 50 scrubs with IPA.

Example 12

It was discovered that the addition of chain transfer agents, which lower the molecular weight of the polymer, is detrimental to the performance of the coatings of this invention. This is illustrated in Table XIII which shows that even small amounts of chain transfer agent result in inadequate solvent resistance (isopropanol scrub resistance). The latex monomer composition was 6 pphm polystyrene seed, 62 pphm methylmethacrylate 26 pphm 2-ethylhexyl acrylate and 6 pphm hydroxyethyl acrylate

TABLE XIII

| Example | Sulfole 120* | IPA Scrub Resistance of Coating** |
|---|---|---|
| 12-1 | 0 | Pass |
| 12-2 | 0.2 | Fail |
| 12-3 | 0.4 | Fail |

*Sodium dodecyl mercaptan chain transfer agent. Parts are in pphm.
**The coatings contained (all parts on dry basis) 90 parts latex, 10 parts Cymel 303 and 2 parts paratoluene sulfonic acid.

As is apparent from the foregoing, we have discovered water based compositions which are particularly suitable for application as stain resistant/cleanable coatings. These low VOC coatings significantly reduce the use and emission of solvents in the manufacturing environment. The ease of stain removal without the use of harsh solvents is an additional benefit in consumer safety compared to presently used coatings which require more aggressive solvents to remove severe stains.

While in accordance with the patent statutes the best mode and preferred embodiment has been set forth, the scope of the invention is not limited thereto, but rather by the scope of the attached claims.

What is claimed is:

1. A latex coating composition comprising a crosslinkable acrylic polymer which is prepared substantially in the absence of chain transfer agents, an amino resin crosslinking agent, and from about 3 to about 50 parts by weight of a polyvinyl alcohol for improving shelf-stability and for reducing gloss on a coated substrate, at least a majority weight of the monomeric units comprising said acrylic polymer being one or more alkyl acrylates, alkyl methacrylates or a combination thereof, about 2 to about 9 percent by weight of the monomeric units of said acrylic polymer being one or more hydroxyalkyl acrylates, hydroxyalkyl methacrylates or a combination thereof, and wherein said parts by weight are per 100 parts by weight on a dry basis of said acrylic polymer and said amino resin crosslinking agent.

2. The latex coating composition of claim 1, wherein the volatile organic compound content is less than about 1 percent by weight and the amount of polyvinyl alcohol is from about 6 parts to about 50 parts by weight.

3. The latex coating composition of claim 1, which further comprises from about 5 to about 50 parts by weight per 100 parts by weight of the total weight of said acrylic polymer and said crosslinking agent, on a dry basis, of a silica flatting agent, and an effective amount of a polysiloxane, containing functionality to cause absorbance onto the silica to improve the dispersibility of said silica flatting agent.

4. The latex coating composition of claim 3, wherein said polysiloxane is a polydimethysiloxane.

5. The latex coating composition of claim 3, wherein said polysiloxane is aminoethylaminopropyl-dimethoxy-silyl-end-blocked polydimethylsiloxane, and wherein said effective amount is from about 0.01 to about 25 parts by weight per 100 parts by weight of the total weight of said acrylic polymer and said crosslinking agent, on a dry basis.

6. The composition of claim 1, wherein said acrylic polymer includes less than about 5 parts by weight of one or more monomers having carboxylic functionality and from about 2 to about 9 parts by weight of one or more monomers having hydroxyalkyl ester functionality, the balance of said acrylic polymer consisting of non-functional monomers selected from the group consisting of alkyl methacrylates, alkyl acrylates and vinyl aromatics, said vinyl aromatics having from about 8 to about 12 carbon atoms.

7. The composition of claim 6, wherein said hydroxyalkyl ester functional monomer is a hydroxyalkyl acrylate, and wherein said non-functional monomers are 2-ethylhexyl acrylate and methyl methacrylate.

8. The composition of claim 1, which further comprises an effective amount of a dialkyl ester sulfosuccinic acid surfactant which enhances solvent resistance.

9. A latex coating composition comprising a crosslinkable acrylic polymer which is prepared substantially in the absence of chain transfer agents, an amino resin crosslinking agent, from about 3 to about 50 parts by weight of a polyvinyl alcohol for improving shelf-stability and for reducing gloss on a coated substrate, and from about 0.5 to about 10 parts by weight of sodium bis(2-ethylhexyl)sulfosuccinate, at least a majority by weight of the monomeric units comprising said acrylic polymer being one or more alkyl acrylates, alkyl methacrylates or a combination thereof, about 2 to about 9 percent by weight of the monomeric units of said acrylic polymer being one or more hydroxyalkyl acrylates, hydroxyalkyl methacrylates or a combination thereof, and wherein said parts by weight are per 100 parts by weight on a dry basis of said acrylic polymer and said amino resin crosslinking agent.

* * * * *